United States Patent
Eschelbach et al.

(10) Patent No.: US 6,234,553 B1
(45) Date of Patent: May 22, 2001

(54) FLEXIBLE SEAT SYSTEM

(75) Inventors: Randy Glenn Eschelbach, Canton; Glenn Scott, Dexter; James Anthony Dykla, Livonia, all of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/165,896

(22) Filed: Oct. 2, 1998

(51) Int. Cl.$^7$ ................................................. B60N 2/32
(52) U.S. Cl. ......................... 296/65.14; 296/65.16; 296/69; 296/65.13; 296/65.09; 296/65.05; 297/15
(58) Field of Search ........................ 296/63, 65.01, 296/65.05, 65.09, 65.14, 65.13, 65.16, 65.17, 65.18, 69; 297/15, 130

(56) References Cited

U.S. PATENT DOCUMENTS

| | | | |
|---|---|---|---|
| 179,565 | * | 7/1876 | Jones et al. ............... 296/65.05 |
| 895,552 | * | 8/1908 | Gehrke ............................ 297/15 |
| 3,097,881 | | 7/1963 | Aguilar .......................... 296/66 |
| 3,151,906 | | 10/1964 | Roberts ........................... 296/66 |
| 3,202,453 | | 8/1965 | Richards ......................... 296/66 |
| 3,227,488 | * | 1/1966 | Kosbab et al. ................ 297/330 |
| 5,011,210 | | 4/1991 | Inoue ............................. 296/69 |
| 5,195,795 | | 3/1993 | Cannera et al. .............. 296/65.09 |
| 5,269,581 | | 12/1993 | Odagaki et al. ................. 296/66 |
| 5,482,349 | | 1/1996 | Richter et al. .................. 297/15 |
| 5,492,386 | | 2/1996 | Callum ........................... 296/64 |
| 5,570,931 | | 11/1996 | Kargillis et al. ............ 297/378.12 |
| 5,890,758 | * | 4/1999 | Pone et al. ...................... 297/15 |
| 5,975,612 | * | 11/1999 | Macey et al. .................... 296/66 |
| 6,012,755 | * | 1/2000 | Hecht et al. .................. 296/65.03 |
| 6,070,934 | * | 6/2000 | Schafer et al. .................. 297/14 |

FOREIGN PATENT DOCUMENTS

| | | | |
|---|---|---|---|
| 397527 | * | 5/1909 | (FR) ............................... 297/15 |
| 2536349 | * | 5/1984 | (FR) ............................... 297/15 |
| 165584 | * | 7/1921 | (GB) ............................... 297/15 |

* cited by examiner

Primary Examiner—D. Glenn Dayoan
Assistant Examiner—Patricia Engle
(74) Attorney, Agent, or Firm—Foley & Lardner

(57) ABSTRACT

A flexible seating system for a vehicle having a seat with a generally horizontal seat cushion and an upright seat back. The seat is movable from a use position to a stowed position lying flat on the vehicle floor or recessed within a well in the vehicle floor in which the seat back overlies the seat cushion. The seat back has an outboard edge located adjacent a side wall of the vehicle with a slidable bearing device extending from the outboard edge of the seat back to a track mounted to the vehicle side wall to guide motion of the seat back as the seat is moved between the use and stowed positions. One or more supports are provided beneath the seat bottom to hold the seat bottom in a spaced relation above the vehicle floor in the use position. The supports and the seat bottom form a 4-bar linkage which rotates as the seat moves between the use and stowed positions.

21 Claims, 2 Drawing Sheets

FLEXIBLE SEAT SYSTEM

BACKGROUND OF THE INVENTION

The present invention relates generally to vehicle seating and in particular to a seat system which provides flexibility in the use of the vehicle between transporting passengers and carrying cargo within the vehicle.

Vehicle manufacturers are constantly striving to increase the usefulness of motor vehicles. Doing so enables consumers to perform a greater variety of tasks with their vehicles. In many vehicles, the rear seating area is used more often for carrying cargo than it is for carrying passengers. This is particularly true in multipurpose passenger vehicles (MPV's) and sport utility vehicles (SUV's) having three rows of seats. The third row seat may be used for A passengers only in a few instances when a large number of passengers are being transported at a given time. Much of the time, the area occupied by the third row seat is used for carrying cargo. Thus, it is desirable to provide a seating system for such vehicles, particularly the third row seat, which can quickly and easily be changed from carrying passengers to carrying cargo in the vehicle.

One means to provide the desired flexibility between passengers and cargo in a vehicle is with seats that can be removed from the vehicle when not being used for passengers to increase the cargo carrying capacity of the vehicle. A difficulty with removable seats is that often the seats are heavy, making them difficult to lift and maneuver out of the vehicle. Accordingly, a need exists for a seat that can be conveniently stored within the vehicle and occupy a minimal amount of space therein to maximize the cargo carrying capability of the vehicle.

SUMMARY OF THE INVENTION

The present invention provides a flexible seating system in which a vehicle seat having a generally horizontal seat cushion and an upright seat back is movable from a use position to a stowed position lying flat upon the vehicle floor or recessed within a well in the vehicle floor. The seat back has an outboard edge located adjacent to a side wall of the vehicle. The seat back is connected through a sliding bearing device to a track fixed to the side wall to guide the motion of the seat back as the seat is moved between the use position and stowed position. The seat bottom can be supported on one or more links coupled to the vehicle floor which serve as stanchions for supporting the seat bottom in the use position. If two stanchions are used, a front stanchion and a rear stanchion, the stanchions and the seat bottom function as a 4-bar linkage which rotates between the use and stowed positions of the seat.

In a typical embodiment, a pair of identical seats will be provided in the vehicle to form the third seating row. Each seat is movable between an upright use position and a stowed position so that depending upon the needs of the vehicle user, one or both of the seats can be used for passengers or one or both of the areas occupied by the seats can be used for carrying cargo. Alternatively, a single seat extending the width of the vehicle can be provided in which the seat back has an outboard edge along each side wall of the vehicle body. The seat back can be attached to a track in each of the vehicle side walls for guiding movement of the seat back between the use and stowed positions.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
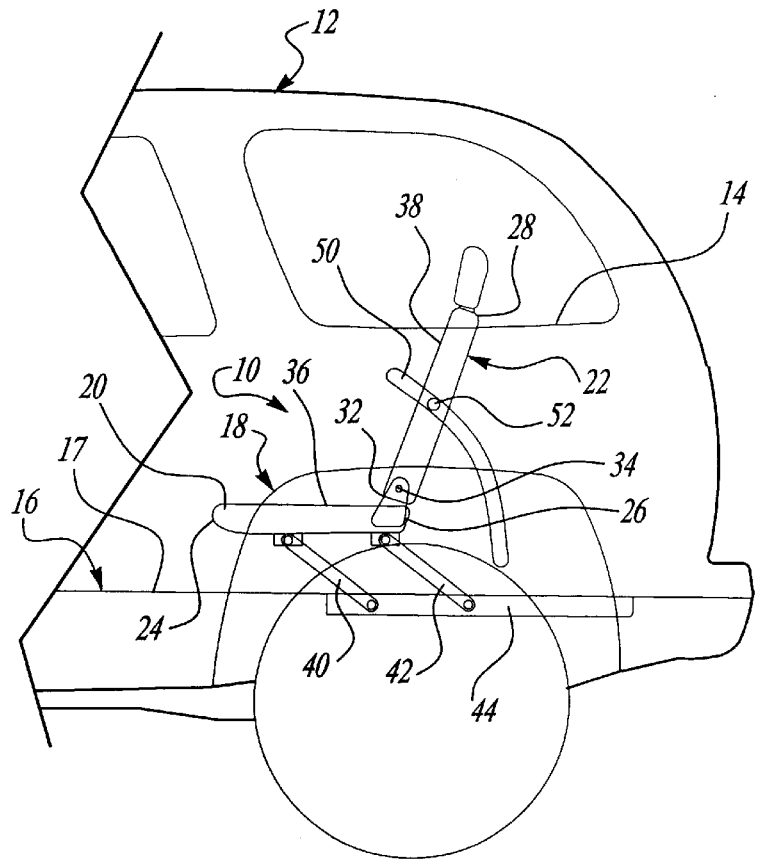
FIG. 1 is a side elevational view showing the seat system of the present invention in a motor vehicle with the seat in the upright use position.

The following description of the preferred embodiment is merely exemplary and is in not intended to limit the invention or its intended uses.

The present invention is a flexible seating system which may be incorporated in a vehicle where flexibility between providing passenger seating positions and open space for cargo or other purposes is important. While the description of the invention uses an automotive vehicle, such as a sport utility vehicle or minivan, it will be recognized by those skilled in the art that this invention can also be used in boats, campers, recreational vehicles, airplanes, or any other vehicle where this flexibility is desired.

The seat system of the present invention is shown in the figures and designated generally at 10. The seat system 10 is shown within a motor vehicle 12 having an upright side wall 14 and a generally horizontal floor 16. The seat system 10 includes a seat 18 which is formed by a seat bottom 20 and a seat back 22. The seat bottom 20 has a front end 24 and rear end 26. The seat back 22 has an upper end 28 and a lower end 30.

A seat back support 32 extends from the rear end 26 of the seat bottom to attach the seat back 22 thereto at the lower end 30 of the seat back. The seat back 22 is attached to the support 32 for rotation about a pivot 34. The seat bottom 20 has a generally horizontal use position, shown in FIG. 1, in which the top of the seat bottom forms a seat bottom seating surface 36. Likewise, the seat back 22 has a generally upright use position in which the seat back 22 extends upwardly from the rear end 26 of the seat bottom 20 in which the front of the seat back 22 forms a seat back seating surface 38.

Figure 2:
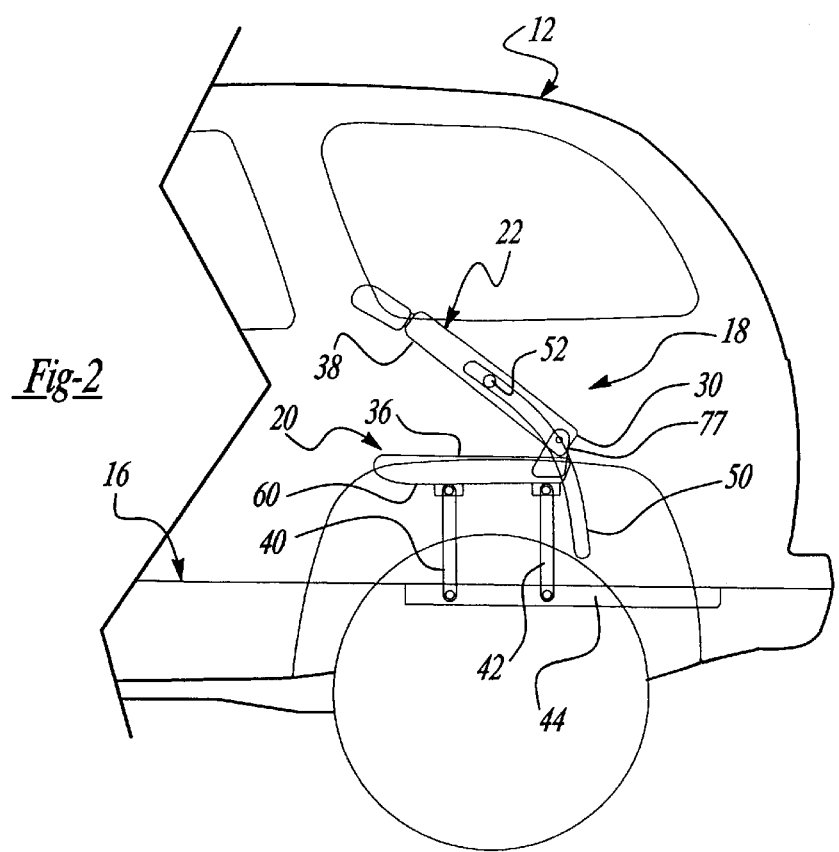
FIG. 2 is a view similar to FIG. 1 showing the seat in an intermediate position during movement from the use position to the stowed position.
Figure 3:
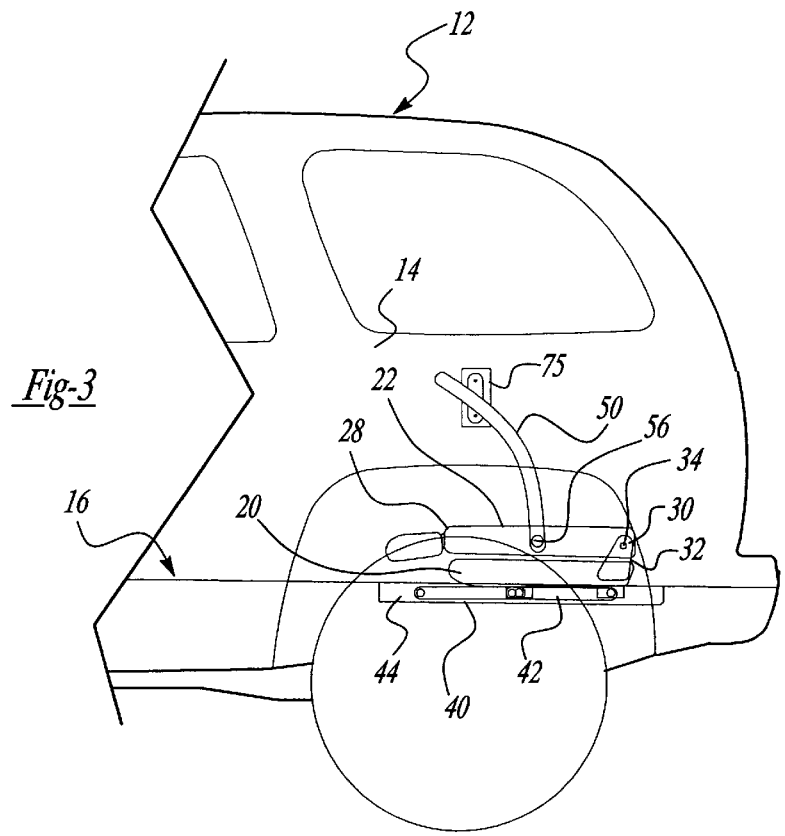
FIG. 3 is a view similar to FIG. 1 showing the seat in the stowed position.

The seat 18 is installed in the vehicle 12 for movement from the use position shown in FIG. 1 to a stowed position shown in FIG. 3, rearward of the use position. The seat bottom 20 is supported on at least one front stanchion 40 and at least one rear stanchion 42. The stanchions 40, 42 are pivotally connected to the vehicle floor 16 at their lower ends below the upper surface 17 of the floor 16, in a recess 44. The upper ends of the stanchions are pivotally coupled to the seat bottom 20. The stanchions 40, 42, the seat bottom 20 and the vehicle floor 16 form a 4-bar linkage. The stanchions 40, 42 are rotatable from the upright use position shown in FIG. 1 to the stowed position shown in FIG. 3. FIG. 2 illustrates an intermediate position of the seat between the use and stowed positions in which the stanchions 40, 42 are substantially vertical.

Figure 4:
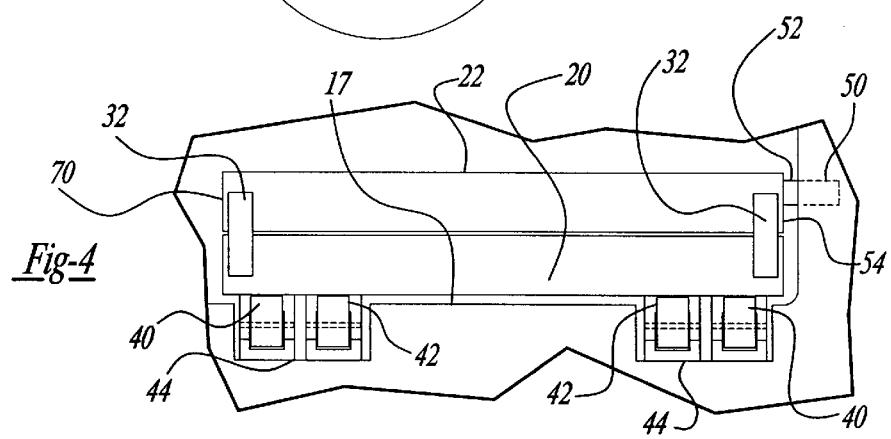
FIG. 4 is a rear view of the seat system showing the seat in a stowed position upon the vehicle floor.

The seating system 10 further includes a side wall track 50 attached to the side wall 14 of the vehicle 12. The side wall track 50 may be extruded, stamped or formed of metal, plastic, resin or composite material. The side wall track is provided with a cross section which will capture a slidable bearing device 52 which extends laterally from an outboard edge 54 of the seat back 22 as shown in FIG. 4. The outboard edge 54 of the seat back 22 is adjacent to the side wall 14 of the vehicle. In the embodiment shown, the track 50 has a generally C shaped section and the slidable bearing device 52 includes a wheel 56 inserted within the C shaped section of the track 50. Other track cross sections and complementary slidable bearing devices can readily be exchanged for that described. The slidable bearing device 52 is attached to the seat back near its upper end. The track 50 and slidable bearing device 52 cooperate to guide the motion of the seat back 22 as the seat 18 is moved to its stowed position. When the seat 18 moves from the use position to the stowed position, the seat back 22 rotates about the pivot 34 to a position resting upon the seating surface 36 of the seat bottom 20.

The track 50 is shown having an arcuate path for the slidable bearing device 52. Depending upon the desired motion for the seat back, the side wall track could be straight. The track extends above the upper surface 17 of the vehicle floor to couple to the seat back 22.

In the stowed position shown in FIG. 4, the seat bottom 20 rests upon the upper surface 17 of the vehicle floor 16.

To provide for surface to surface contact between the floor 16 and the lower surface 60 of the seat bottom 20, the stanchions 40, 42 fit within the recesses 44 in the vehicle floor so that the stanchions are below the floor surface 17. As shown in FIG. 4, two pairs of front and rear 3 stanchions 40, 42 are provided. One pair of stanchions is located near the outboard edge of the seat, adjacent the vehicle wall 14. Another pair of stanchions is located along an inboard edge 70 of the seat 18.

Figure 5:
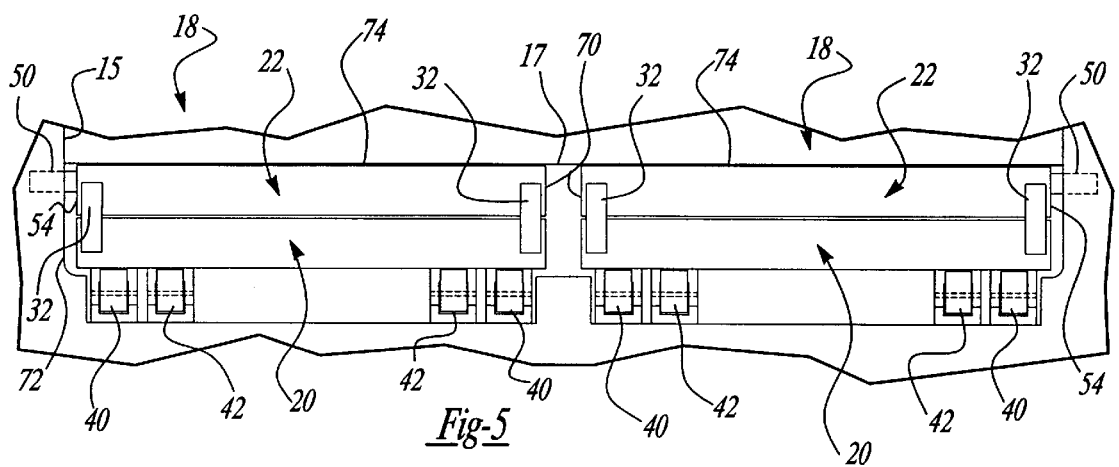
FIG. 5 is a rear view of an alternative embodiment showing the seat stowed in a well beneath the floor surface and showing two identical seats side by side forming a seating row across the vehicle.

In a preferred embodiment shown in FIG. 5, the inboard edge 70 is near the vehicle center line. A second, identical, seat 18 is provided between the vehicle center line and the opposite vehicle side wall 15. As can be readily appreciated, the seats need not meet in the vehicle center line. One seat could be wider than the other, if desired. For example, one seat can be wide enough for two seating positions while the other seat only has one seating position. Alternatively, a single seat 18 can be provided which extends from the side wall 14 to the opposite vehicle side wall 15. In such a case, both outboard edges of the seat back would have slidable bearing devices traveling in tracks in the two vehicle side walls.

In an alternative embodiment of the seat system of the present invention, shown in FIG. 5, the seat bottom and seat back are stowed in a well 72 beneath the surface 17 of the floor 16. This enables the rear surface 74 of the seat back 22 to form a continuation of the vehicle floor surface 17 when the seat is in the stowed position. The rear surface 74 of the seat back may be formed of a hard protective shell or with a carpet-like decorative covering to match the floor covering within the vehicle.

The track 50 may include a latch mechanism 75 (shown in FIG. 3) to lock the slidable bearing device 52 in place in the track when the seat is in the use position. The latch mechanism 75 may be a manually actuated mechanical latch or a power drive mechanism to both hold the seat back in the use position and also move the slidable bearing device 52 along the track between the seat use and stowed positions. The power drive would preferably include a cable or chain drive system attached to the slidable bearing device 52.

Other drive systems such as spur gears, rack and pinions, stepper motors and similar devices could be utilized with equal results for moving the bearing device 52 along the track 50. Additionally, the pivot 34 of the seat back 22 to the seat bottom 20 may include a locking mechanism 77 to hold the seat back 22 in a fixed angular position relative to the seat bottom 20. This locking mechanism 77 can be a manual recliner type locking device or a power driven recliner type device to rotate the seat back about the pivot 34. Thus, the seat 18 can be power driven between the use and stowed positions. With power driven track and hinge mechanisms, the recline angle of the seat back relative to the seat bottom can be adjusted.

Lock mechanisms may also be provided at one or both ends of the stanchions 40, 42 to hold the stanchions fixed in the seat use position. Such lock mechanisms may be power actuated to release the stanchions for rotation from the use position. Such a mechanism would be similar to a remotely released trunk latch.

The seat system 10 of the present invention provides a seat which can be easily and readily moved from a use position to a stowed position within the motor vehicle. This eliminates the need for removal of the seat when it is desired to carry cargo within the motor vehicle.

It is to be understood that the invention is not limited to the exact construction illustrated and described above, but that various changes and modifications may be made without departing from the spirit and scope of the invention as defined in the following claims

What is claimed is:

1. A seating system for use in a vehicle having a longitudinally extending upright side wall and a generally horizontal floor, said seating system comprising:

a seat having a seat bottom with front and rear ends and an upper surface forming a seat bottom seating surface, said seat bottom having a generally horizontal use position and being movable from said use position to a stowed position, and a seat back having upper and lower ends and a front surface forming a seat back seating surface, said seat back being pivotally coupled at said lower end to said rear end of said seat bottom, said seat back extending generally upwardly from said seat bottom in a use position, said seat back having an outboard edge disposed adjacent to the side wall of the vehicle, and said seat back being movable from said use position to a generally horizontal stowed position overlying said seat bottom;

a track operable to be coupled to the side wall of the vehicle; and a slidable bearing device coupled to said seat back above said lower end at said outboard edge and extending outward therefrom, said slidable bearing device being coupled to said track for movement along said track to guide movement of said seat back between said use and stowed positions.

2. The seat system as defined in claim 1 further comprising a support extending between the floor and said seat bottom for supporting said seat bottom in said use position spaced above the floor.

3. The seat system as defined in claim 2 wherein said support includes a front link extending from the floor to the seat bottom and a rear link extending from the floor to the seat bottom rearward of said front link, said links having upper ends rotatably coupled to said seat bottom and lower ends rotatably coupled to the floor whereby said links, said seat bottom and the floor form a four bar linkage for movement of said seat bottom between said use and stowed positions.

4. The seat system as defined in claim 3 further comprising an outboard pair of said front and rear links and an inboard pair of said front and rear links spaced laterally inward of said outboard pair of said front and rear links.

5. The seat system as defined in claim 1 wherein the vehicle floor includes a well below an upper surface of the floor and said seat bottom and said seat back are disposed within the well when in said stowed positions.

6. A seating system for use in a vehicle having a longitudinally extending upright side wall and a generally horizontal floor, said seating system comprising:

a seat having a seat bottom with front and rear ends and an upper surface forming a seat bottom seating surface, said seat bottom having a generally horizontal use position spaced above the vehicle floor and said seat bottom being movable from said use position to a stowed position, and a seat back having upper and lower ends and a front surface forming a seat back seating surface, said seat back being pivotally coupled at said lower end to said rear end of said seat bottom, said seat back extending generally upwardly from said seat bottom in a use position, said seat back having an outboard edge disposed adjacent to the side wall of the vehicle, and said seat back being movable from said use position to a generally horizontal stowed position overlying said seat bottom;

a track operable to be coupled to the side wall of the vehicle said track being spaced apart from said stowed position of said seat bottom;

a slidable bearing device coupled to said seat back at said outboard edge and extending outward therefrom said slidable bearing device being coupled to said track for movement along said track to guide movement of said seat back between said use and stowed positions;

a support extending between the floor and said seat bottom for supporting said seat bottom in said use position spaced above the floor, said support including a front link extending from the floor to the seat bottom and a rear link extending from the floor to the seat bottom rearward of said front link, said links having upper ends rotatably coupled to said seat bottom and lower ends rotatably coupled to the floor whereby said links said seat bottom and the floor form a four bar linkage for movement of said seat bottom between said use and stowed positions; and wherein said links extend upwardly and forwardly from said lower ends when said seat bottom is in said use position.

7. The seat system as defined in claim 6 wherein said seat bottom moves rearward and downward as said seat bottom moves from said use position to said stowed position.

8. A seating system for use in a vehicle having a longitudinally extending upright side wall and a generally horizontal floor including a recess, said seating system comprising:

a seat having a seat bottom with front and rear ends and an upper surface forming a seat bottom seating surface, said seat bottom having a generally horizontal use position spaced above the vehicle floor and said seat bottom being movable from said use position to a stowed position, and a seat back having upper and lower ends and a front surface forming a seat back seating surface, said seat back being pivotally coupled at said lower end to said rear end of said seat bottom, said seat back extending generally upwardly form said seat bottom in a use position, said seat back having an outboard edge disposed adjacent to the side wall of the vehicle, and said seat back being movable from said use position to a generally horizontal stowed position overlying said seat bottom;

a track operable to be coupled to the side wall of the vehicle, said track being spaced apart from said stowed position of said seat bottom;

a slidable bearing device coupled to said seat back at said outboard edge and extending outward therefrom, said slidable bearing device being coupled to said track for movement along said track to guide movement of said seat back between said use and stowed positions;

a support extending between the floor and said seat bottom for supporting said seat bottom in said use position spaced above the floor, wherein said support is disposed in the recess when said seat bottom is in said stowed position whereby said seat bottom can rest upon an upper surface of the floor.

9. A seating system for use in a vehicle having a longitudinally extending upright side wall and a generally horizontal floor, said seating system comprising:

a seat having a seat bottom with front and rear ends and an upper surface forming a seat bottom seating surface, said seat bottom having a generally horizontal use position spaced above the vehicle floor and said seat bottom being movable from said use position to a stowed position, and a seat back having upper and lower ends and a front surface forming a seat back seating surface, said seat back being pivotally coupled at said lower end to said rear end of said seat bottom, said seat back extending generally upwardly from said seat bottom in a use position, said seat back having an outboard edge disposed adjacent to the side wall of the vehicle, and said seat back being movable from said use position to a generally horizontal stowed position overlying said seat bottom;

a track operable to be coupled to the side wall of the vehicle, said track being spaced apart from said stowed position of said seat bottom, wherein said track defines an arcuate path for travel of said slidable bearing device; and a slidable bearing device coupled to said seat back at said outboard edge and extending outward therefrom, said slidable bearing device being coupled to said track for movement along said track to guide movement of said seat back between said use and stowed positions.

10. A seating system for use in a vehicle having left and right laterally spaced and longitudinally extending upright side walls and a generally horizontal floor therebetween, said seating system comprising:

left and right seats each having a seat bottom with front and rear ends and an upper surface forming a seat bottom seating surface, said seat bottoms having generally horizontal use positions and being movable from said use positions to stowed positions upon the vehicle floor and each seat further having a seat back with upper and lower ends and front surfaces forming a seat back seating surfaces, said seat backs being pivotally coupled at said lower ends to said rear ends of said seat bottoms, said seat backs extending generally upwardly from said seat bottoms in use positions, said seat backs being movable from said use positions to stowed positions overlying said seat bottoms, said left and right seat bottoms and seat backs having outboard edges adjacent the left and right side walls of the vehicle respectively and inboard edges spaced laterally inwardly of said outboard edges;

left and right tracks operable to be coupled to the left and right side walls of the vehicle respectively, said left and right tracks being spaced apart form at least one of said stowed positions of said seat bottoms; and left and right slidable bearing devices coupled to said left and right seat backs respectively above said lower ends at said outboard edges thereof and extending outwardly therefrom and being coupled to said left and right tracks respectively for movement along said left along said track to guide movement of said left and right seats between said use and stowed positions.

11. The seat system as defined in claim 10 further comprising left and right supports extending between the floor and said left and right seat bottoms for supporting said left and right seat bottoms in said use positions spaced above the floor.

12. The seat system as defined in claim 11 wherein said left and right supports each include a front link extending from the floor to said seat bottoms and a rear link extending from the floor to said seat bottoms rearward of said front links, said links having upper ends rotatably coupled to said seat bottoms and lower ends rotatably coupled to the floor whereby said links, said seat bottoms and the floor form four bar linkages for movement of said seat bottoms between said use and stowed positions.

13. The seat system as defined in claim 12 further comprising an outboard pair of said front and rear links coupled to each of said left and right seat bottoms and an inboard pair of said front and rear links spaced laterally inward of said outboard pair of said front and rear links.

14. The seat system as defined in claim 10 wherein the vehicle floor includes a well below an upper surface of the floor and said seat bottoms and said seat backs are disposed within the well when in said stowed positions.

15. A seating system for use in a vehicle having left and right laterally spaced and longitudinally extending upright side walls and a generally horizontal floor therebetween, said seating system comprising:

left and right seats each having a seat bottom with front and rear ends and an upper surface forming a seat bottom seating surface, said seat bottoms having generally horizontal use positions and being movable from said use positions to stowed positions upon the vehicle floor and each seat further having a seat back with upper and lower ends and front surfaces forming a seat back seating surfaces, said seat backs being pivotally coupled at said lower ends to said rear ends of said seat bottoms, said seat backs extending generally upwardly from said seat bottoms in use positions, said seat backs being movable from said use positions to stowed positions overlying said seat bottoms, said left and right seat bottoms and seat backs having outboard edges adjacent the left and right side walls of the vehicle respectively and inboard edges spaced laterally inwardly of said outboard edges;

left and right tracks operable to be coupled to the left and right side walls of the vehicle respectively, said left and right tracks being spaced apart from at least one of said stowed positions of said seat bottoms;

left and right slidable bearing devices coupled to said left and right seat backs respectively at said outboard edges thereof and extending outwardly therefrom and being coupled to said left and right tracks respectively for movement along said left and right tracks to guide movement of said left and right seats between said use and stowed positions; and left and right supports extending between the floor and said left and right seat bottoms for supporting said left and right seat bottoms in said use positions spaced above the floor, wherein said left and right supports each include a front link extending from the floor to said seat bottoms and a rear link extending from the floor to said seat bottoms rearward of said front links, said links having upper ends rotatably coupled to said seat bottoms and lower ends rotatably coupled to the floor whereby said links, said seat bottoms and the floor form four bar linkages for movement of said seat bottoms between said use and stowed positions, said links extending upwardly and forwardly from said lower ends when said seat bottoms are in said use positions.

16. The seat system as defined in claim 15 wherein said seat bottoms move rearward and downward as said seat bottoms move from said use positions to said stowed positions.

17. A seating system for use in a vehicle having left and right laterally spaced and longitudinally extending upright side walls and a generally horizontal floor therebetween, said seating system comprising:

left and right seats each having a seat bottom with front and rear ends and an upper surface forming a seat bottom seating surface, said seat bottoms having generally horizontal use positions and being movable from said use positions to stowed positions upon the vehicle floor and each seat further having a seat back with upper and lower ends and front surfaces forming a seat back seating surfaces, said seat backs being pivotally coupled at said lower ends to said rear ends of said seat bottoms, said seat backs extending generally upwardly from said seat bottoms in use positions, said seat backs being movable from said use positions to stowed positions overlying said seat bottoms said left and right seat bottoms and seat backs having outboard edges adjacent the left and right side walls of the vehicle respectively and inboard edges spaced laterally inwardly of said outboard edges;

left and right tracks operable to be coupled to the left and right side walls of the vehicle respectively said left and right tracks being spaced apart from at least one of said stowed positions of said seat bottoms;

left and right slidable bearing devices coupled to said left and right seat backs respectively at said outboard edges thereof and extending outwardly therefrom and being coupled to said left and right tracks respectively for movement along said left and right tracks to guide movement of said left and right seats between said use and stowed positions; and left and right supports extending between the floor and said left and right seat bottoms for supporting said left and right seat bottoms in said use positions spaced above the floor, wherein said supports are disposed in the recess when said seat bottoms are in said stowed positions whereby said seat bottoms can rest upon an upper surface of the floor.

18. A seating system for use in a vehicle having left and right laterally spaced and longitudinally extending upright side walls and a generally horizontal floor therebetween, said seating system comprising:

left and right seats each having a seat bottom with front and rear ends and an upper surface forming a seat bottom seating surface, said seat bottoms having generally horizontal use positions and being movable from said use positions to stowed positions upon the vehicle floor and each seat farther having a seat back with upper and lower ends and front surfaces forming a seat back seating surfaces, said seat backs being pivotally coupled at said lower ends to said rear ends of said seat bottoms, said seat backs extending generally upwardly from said seat bottoms in use positions, said seat backs being movable from said use positions to stowed positions overlying said seat bottoms said left and right seat bottoms and seat backs having outboard edges adjacent the left and right side walls of the vehicle respectively and inboard edges spaced laterally inwardly of said outboard edges;

left and right tracks operable to be coupled to the left and right side walls of the vehicle respectively, said left and right tracks being spaced apart from at least one of said stowed positions of said seat bottoms; wherein said tracks define arcuate paths for travel of said slidable bearing devices; and left and right slidable bearing devices coupled to said left and right seat backs respectively at said outboard edges thereof and extending outwardly therefrom and being coupled to said left and right tracks respectively for movement along said left and right tracks to guide movement of said left and right seats between said use and stowed positions.

19. A seating system for use in a vehicle having a side wall said seating system comprising:

a seat having a seat back and a seat bottom and being moveable between a use position and a stowed position;

a track operable to be coupled to the side wall of the vehicle; and a slidable bearing device coupled to said seat back above a lower end of said seat back and coupled to said track for movement along said track to guide movement of said seat between said use position and said stowed position.

20. The seating system of claim 19, wherein said seat includes an outboard edge positioned adjacent to the side wall of the vehicle, said slidable bearing device extending from said outboard edge.

21. The seating system of claim 19, wherein said seat includes a seat back, said slidable bearing device being coupled to said seat back and coupled to said track for movement along said track to guide movement of said seat back between said use position and said stowed position.

* * * * *

UNITED STATES PATENT AND TRADEMARK OFFICE
CERTIFICATE OF CORRECTION

PATENT NO.     : 6,234,553 B1
DATED          : May 22, 2001
INVENTOR(S)    : Eschelbach et al.

It is certified that error appears in the above-identified patent and that said Letters Patent is hereby corrected as shown below:

<u>Column 7,</u>
Lines 9 and 10, please delete "along said track" and insert therefor -- and right tracks --.

Signed and Sealed this

Twenty-sixth Day of March, 2002

Attest:

JAMES E. ROGAN
*Attesting Officer*          *Director of the United States Patent and Trademark Office*